United States Patent
Sayman et al.

(10) Patent No.: US 6,874,383 B2
(45) Date of Patent: Apr. 5, 2005

(54) ADAPTIVE SHIFT SEQUENCING

(75) Inventors: Robert A. Sayman, Laurinburg, NC (US); James H. Devore, Laurinburg, NC (US); Mario Steinborn, Friedrichshafen (DE); Ronald P. Muetzel, Southern Pines, NC (US); Rupert Kramer, Friedrichshafen (DE)

(73) Assignee: ZF Meritor, LLC, Maxton, NC (US)

( * ) Notice: Subject to any disclaimer, the term of this patent is extended or adjusted under 35 U.S.C. 154(b) by 10 days.

(21) Appl. No.: 10/602,115

(22) Filed: Jun. 23, 2003

(65) Prior Publication Data
US 2004/0259686 A1 Dec. 23, 2004

(51) Int. Cl.[7] .............................................. F16H 59/36
(52) U.S. Cl. ...................................................... 74/335
(58) Field of Search ........................... 74/335; 477/121

(56) References Cited

U.S. PATENT DOCUMENTS

| | | | | |
|---|---|---|---|---|
| 5,123,301 A | * | 6/1992 | Hagele et al. | 477/121 |
| 5,133,232 A | * | 7/1992 | Kikuchi et al. | 477/120 |
| 6,032,096 A | * | 2/2000 | Takahashi | 477/121 |
| 6,711,487 B2 | * | 3/2004 | Murakami et al. | 701/69 |
| 2001/0037697 A1 | * | 11/2001 | Nanri et al. | 74/335 |
| 2003/0200016 A1 | * | 10/2003 | Spillane et al. | 701/48 |

* cited by examiner

*Primary Examiner*—Sherry Estremsky
(74) *Attorney, Agent, or Firm*—Carlson, Gaskey & Olds

(57) ABSTRACT

The inventive transmission has at least two different shift modes for shifting between the same two gear ratios. A control unit electronically senses various vehicle conditions and based on this information selects the appropriate shift mode suited for the particular driving situation. The transmission then shifts from one gear ratio to another based on this selection.

18 Claims, 3 Drawing Sheets

| VEHICLE CONDITIONS | PARKING LOT NORMAL | PARKING LOT TURNS | CITY DRIVING NORMAL | CITY DRIVING TURNS | HIGHWAY DRIVING NORMAL | HILLS NORMAL | HILLS POWER DOWNSHIFT | HILLS LOW SPEED LOW GEAR | PASSING |
|---|---|---|---|---|---|---|---|---|---|
| THROTTLE POSITION | <LOW | <MED | >HIGH | >HIGH | N/A | ~100% | ~100% | ~100% | ~100% |
| VEHICLE SPEED | 0 - LOW | 0 - LOW | LOW>MED | LOW>MED | HIGH | LOW>HIGH | HIGH>MED | LOW | LOW |
| VEHICLE ACCELERATION | <LOW | <LOW | HIGH | HIGH | LOW | LOW | -(MINUS) | LOW | LOW |
| TURNING/NOT TURNING | NO | YES | NO | YES | NO | NO | NO | N/A | N/A |
| CRUISE CONTROL STATUS | N/A | N/A | N/A | N/A | ON OR OFF | N/A | N/A | N/A | N/A |
| DRIVING RESISTANCE | N/A | N/A | NORMAL | NORMAL | NORMAL | HIGH | HIGH | HIGH | HIGH |
| WARM/COLD CONDITIONS | N/A | N/A | N/A | N/A | N/A | WARM | WARM | WARM | WARM |
| OUTPUT: CHOSEN SHIFT MODE | | | | | | | | | |
| BUSES | 5 | 4 | 4 | 4 | 5 | 4 | 3 | 2 | 0 |
| TRUCKS | 4 | 3 | 3 | 3 | 5 | 2 | 2 | 1 | 0 |

Fig-3

SYSTEM ADJUSTMENTS

PREDETERMINED ENGINE TORQUE
ENGINE BRAKING
TRANSMISSION ACTUATOR
RANGE OF ENGINE SPEED
FOR SHIFT
CLUTCH CONFIGURATION
ENGINE CONFIGURATION

*Fig-4*

ADAPTIVE SHIFT SEQUENCING

BACKGROUND OF THE INVENTION

A vehicle transmission allows a gear ratio between an engine and drive wheels of the vehicle to change as the vehicle speeds up and slows down. The transmission may be manual, automatic or an automatic manual. A manual transmission permits a vehicle operator to manually control the changing of the gear ratios available to the transmission. An automatic transmission changes the gear ratio automatically. An automatic manual transmission, however, gives the vehicle operator some limited control over the change of the gear ratio and also controls the changing of the gear ratio in the event the vehicle operator chooses not to change the gear ratio.

For an automatic and an automatic manual transmission, the rate of the shift between one gear ratio to another gear ratio is constant. A constant shift rate, however may be undesirable. Indeed, the need to shift may vary from driving situation to driving situation. For example, a vehicle in cruise control mode requires very little shifting between gears. On the other hand, a vehicle climbing up a hill requires fast and responsive shifting. Yet, in existing automatic transmissions and automatic manual transmissions the rate of shifting is the same for both situations. For a manual transmission, the rate of shifting is dictated by the vehicle operator. However, for automatic manual and automatic transmission, the rate of shifting is typically preset.

A need therefore exists for a motor vehicle that provides the convenience of an automatic transmission and permits the alteration of the shift rate to accommodate for a particular driving circumstance.

SUMMARY OF THE INVENTION

In contrast to existing vehicle transmissions, the inventive transmission system has at least two different modes of operation for each gear ratio. In one mode, the transmission shifts from one gear ratio to another gear ratio at a different rate than the other mode. Based on vehicle data, the transmission system electronically evaluates and selects the appropriate mode of operation for the transmission for the particular driving situation.

The first shift mode may permit the transmission to shift from the first gear ratio to the second gear ratio faster than the second shift mode. Moreover, the transmission system may further have additional shift modes suited for particular driving situations. For example, there may be a shift mode for parking lot driving, city driving, highway driving, hill driving, and passing. Each of these modes creates different shift characteristics for the transmission.

One shift mode may permit the reaching of a predetermined engine torque for the engine faster than another shift mode. A shift mode may result in faster engine braking than the other shift modes. Still, a shift mode may also result in a higher level of responsiveness of a transmission actuator that selects between the first gear ratio and the second gear ratio than other modes. Also, the differing modes may encompass differing ranges of engine speeds in which the transmission will shift between the first gear ratio and the second gear ratio. The shift modes may also offer differing clutch configurations and engine configurations.

The inventive transmission system may receive data from differing vehicle sensors in touch with the vehicle's system and subsystems. The data received from these systems and subsystems may be ranked and prioritized and then electronically evaluated based on the assigned ranking. From this data, the inventive transmission system can determine which mode, whether it be parking lot mode, city driving mode, hill driving mode, passing mode, or highway driving mode, is to be selected based on the vehicle's driving situation.

In this way, the inventive transmission system determines automatically the driving situation encountered by the vehicle. Once determined, the transmission system then selects the mode of transmission operation suited for the driving situation. The vehicle transmission is then optimized and adjusted to perform in the particular mode of operation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 illustrates the driving modes associated with the vehicle conditions.

FIG. 4 illustrates transmission system adjustments that may be made to accommodate each mode.

DETAILED DESCRIPTION OF THE PREFERRED EMBODIMENT

Figure 1:
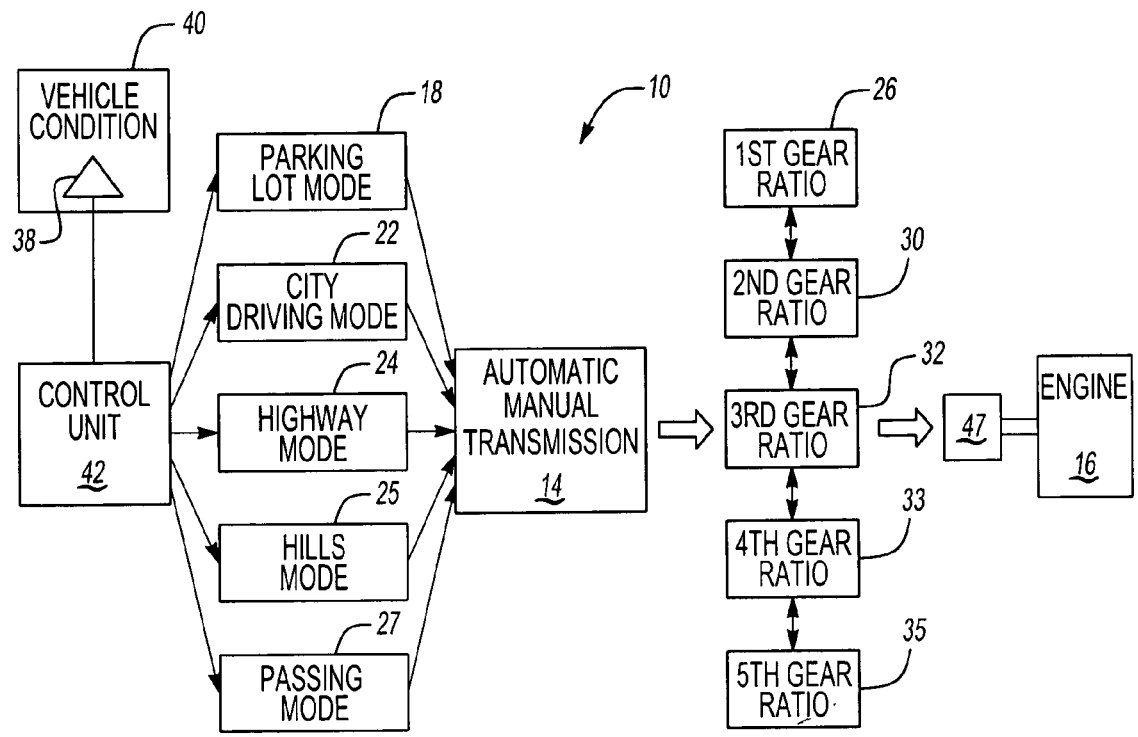
FIG. 1 illustrates a schematic drawing of the inventive transmission system, including an automatic manual transmission having varying driving modes of operation.

FIG. 1 illustrates inventive transmission system 10, which in this instance comprises an automatic manual transmission 14 having a number of varying gear ratios. As known, automatic manual transmission 14 alters a gear ratio between engine 46 and the driving wheels of the vehicle through clutch 47. The automatic manual transmission 14 has first gear ratio 26, second gear ratio 30, third gear ratio 32, fourth gear ratio 33, and fifth gear ratio 35. Each of these gear ratios provides a different gear ratio between engine 46 and the vehicle drive wheels. The automatic manual transmission 14 permits the selection and transition from one gear ratio to another. However, like a manual transmission, the point of shifting between one gear ratio to another may be controlled by a driver. If the driver chooses not to shift, the shift is performed automatically.

In existing systems, the rate of shifting between one gear ratio to another, such as from the first gear ratio 26 to the second gear ratio 30, is constant. This means that the automatic manual transmission 14 shifts from first gear ratio to second gear ratio at the same engine speed, with the same level of engine braking, and with the same range of engine speeds for the shift. These features of automatic manual transmission 14 are typically preset by the manufacturer. As a consequence for any particular driving situation, the shift rate between gear ratios is the same even though a particular driving situation may require faster or slower shifting. For example, in a parking lot, a vehicle operator tends to shift very little and consequently it is preferable to make slower shifts so as to provide a more comfortable ride of the vehicle. However, on a hill, fast shifting is required, and thus a vehicle requires faster shifting between gear ratios than in other circumstances.

To address these concerns, inventive transmission system 10 has differing modes of transmission operation. Here, although there may be more or fewer modes, inventive transmission system 10 has a parking lot mode 18, a city driving mode 22, a highway mode 24, a hill climbing mode 25, and a passing mode 27. Each of these modes configures the automatic manual transmission differently so as to provide different shift characteristics for each mode. For example, parking lot mode 18 shifts from first gear ratio 26 to second gear ratio 30 at a slower rate than the hill climbing mode 25. Hence, hill climbing mode 25 permits shifting from first gear ratio 26 to second gear ratio 30 at a first predetermined speed while parking lot mode 18 permits shifting from first gear ratio 26 to second gear ratio 30 at a second predetermined speed. The first predetermined speed is faster than the second predetermined speed. Each mode may have its own rate of shifting between the same gear ratios with each rate faster than the other. A third mode may have a third predetermined speed slower than the second predetermined speed while a fourth mode may have a fourth predetermined speed slower than the third predetermined speed.

Moreover, for the convenience of the vehicle operator, inventive transmission 10 has a control unit 42 that selects the particular mode depending upon data it receives from sensors 38 that measure and transmit information about various vehicle conditions 40. The control unit 42 uses this information to determine the driving situation, whether it be a parking lot, city driving, highway, hill, or passing situation, and then selects the proper transmission mode of operation corresponding to the situation.

Figure 2:
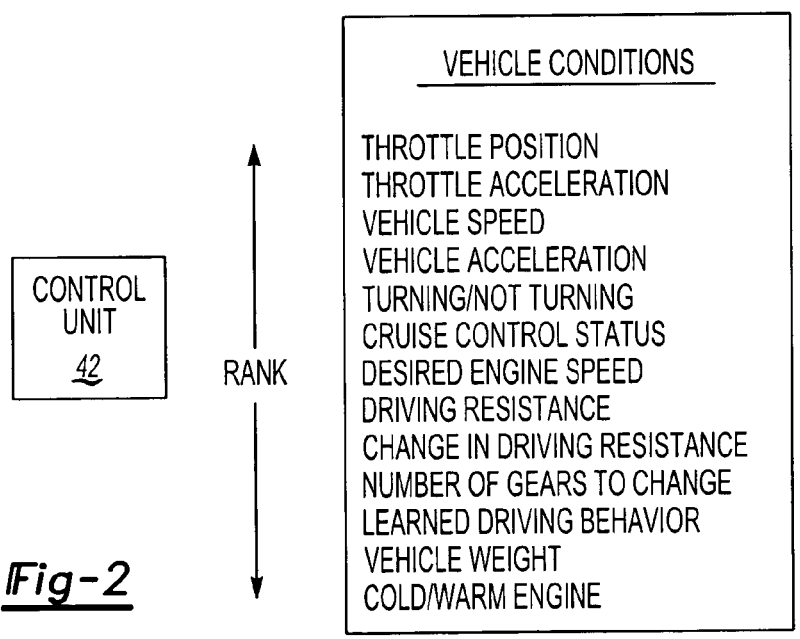
FIG. 2 illustrates various vehicle conditions that may be evaluated by the inventive transmission system.

As shown in FIG. 2, control unit 42 receives a variety of data input from the sensors 38. This data includes information about throttle position, throttle acceleration, vehicle speed, and vehicle acceleration and/or other similar vehicle operation data. In addition, control unit 42 receives information about whether the vehicle is turning or not turning and whether cruise control has been activated. Also, the control unit 42 has the capability to determine the engine speed desired by the vehicle operator as well as whether the engine is warm or cold. Further, the control unit 42 is configured to receive information about driving resistance and change in driving resistance. Driving resistance is affected by wind resistance, gravity, or other similar forces inhibiting movement of the vehicle. Other relevant information includes vehicle weight and the number of gear ratios that can be achieved by the transmission. Finally, the control unit 42 may compile and store data related to the particular driving habits of the vehicle driver, and, with this learned driving behavior, select a particular mode of transmission operation. Under certain operating parameters, these vehicle conditions may provide conflicting information and/or overlap. To address this issue, control unit 42 may rank the importance of the data by assigning a ranking value to each of the vehicle conditions and weigh these values to select the proper mode of transmission operation based on this ranking.

FIG. 3 shows a chart of some of the vehicle conditions of FIG. 2 associated with the driving modes of FIG. 1. As shown, particular vehicle conditions, as sensed by sensors 38 and fed to control unit 42, may be examined and associated with particular modes of transmission operation. Parking lot mode may, in fact, have two differing modes: a mode for linear driving in a parking lot and a mode for turning. Parking lot mode may be characterized by a low throttle position, low vehicle speed, low acceleration and the absence of any turn. When these conditions are read by control unit 42, control unit 42 determines automatic transmission 14 should operate in parking lot mode 18.

Parking lot turns may be characterized by a medium throttle position, low vehicle speed, low vehicle acceleration, and data that the vehicle is, in fact, turning. These inputs may permit parking lot mode 18 to be further adjusted and refined so that automatic manual transmission 14 may be tuned to this particular type of driving. City driving, highway driving, hill driving and passing may also comprise modes of transmission operation each characterized by their own set of vehicle conditions. There may be more or there may be fewer modes of operation. One of ordinary skill in the art may assign particular vehicle conditions to a particular transmission mode.

Control unit 42 determines the particular mode of transmission operation from vehicle conditions and then generates an output signal to adjust the transmission system 10 to accommodate each driving mode. FIG. 3 illustrates a range of shift rates for each particular driving mode ranging from 5, the slowest shift rate, to 0, the highest shift rate. For a bus application, if control unit 42 determines the bus to be in a parking lot based on sensed vehicle conditions, control unit 42 selects the slowest shift rate for automatic manual transmission 14. On the other hand, if control unit 42 determines the bus to be in passing mode, i.e., the throttle position is 100% open, vehicle speed is high, vehicle acceleration is low, driving resistance high and engine conditions warm, then control unit 42 selects the high shift rate for automatic manual transmission 14. As seen in FIG. 3, each driving mode is associated with a particular shift rate. Also, as indicated, buses and trucks may have a different set of shift rates associated with each driving mode. This difference results from the need for buses to prioritize comfort driving over performance in contrast to trucks. Accordingly, for trucks, inventive transmission system 10 may employ generally faster shift rates than for buses.

From the selection of a particular mode of transmission operation, control unit 42 may then effect the change in shift rate for automatic manual transmission 14. The inventive transmission system 10 alters the engine torque range in which a shift may occur. This torque range is typically predetermined. In addition, under certain conditions, control unit 42 could also alter engine braking so as to promote faster or slower shifting. Greater engine braking permits faster shifting at the cost of ride comfort. The transmission actuator may also be adjusted so that the automatic manual transmission more quickly or more slowly selects each gear ratio. The error range of engine speeds in which a shift may occur may also be adjusted. A wider error range permits a faster shift while a narrow error range promotes a smoother and slower shift.

Finally, both clutch 48 and engine 42 may be configured differently so as to accommodate a particular type of driving mode. Such configuration changes may encompass hardware, software and/or mechanical changes to clutch 48 or engine 42. One of ordinary skill in the art can appreciate the types of changes to be made to achieve each particular type of driving mode.

Inventive transmission system 10 thus permits a greater variety of modes of operation for automatic manual transmission 14. Based on sensed vehicle condition data received from sensors 38, control unit 42 may determine the particular mode of operation that the vehicle, whether it be bus, car or truck, encounters. From this information, control unit 42 selects the particular driving mode and implements changes to inventive transmission system 10 so as to alter the shift characteristics thus permitting a slower or faster shift rate from one gear ratio to another depending upon the particular encountered driving situation.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A method of shifting a vehicle transmission, comprising the steps of:
   (a) having at least a first shift mode and a second shift mode, each of the modes permitting a transition from a first gear ratio to a second gear ratio of a transmission;
   (b) electronically sensing at least one vehicle condition;
   (c) electronically evaluating the sensed at least one vehicle condition;
   (d) electronically identifying an appropriate shift mode from among at least the first shift mode and the second shift mode based on the evaluation of step (c); and
   (e) shifting from the first gear ratio to the second gear ratio in the shift mode identified in step (d), wherein the first shift mode permits shifting from the first gear ratio to the second gear ratio at a first predetermined speed and the second shift mode permits shifting from the first gear ratio to the second gear ratio at a second predetermined speed that is less than the first predetermined speed.

2. The method of shifting of claim 1 wherein the at least first shift mode and the second shift mode of step (d) further includes a third shift mode and a fourth shift mode, the third shift mode, shifting from the first gear ratio to the second gear ratio at a third predetermined speed and the fourth shift mode shifting from the first gear ratio to the second gear ratio at a fourth predetermined speed, the third predetermined speed less than the second predetermined speed and the fourth predetermined speed less than the third predetermined speed.

3. The method of shifting of claim 1 wherein the first shift mode permits the reaching of a predetermined engine torque faster than the second shift mode.

4. The method of shifting of claim 1 wherein the first shift mode results in faster engine braking than the second shift mode.

5. The method of shifting of claim 1 wherein a transmission actuator acts faster in the first shift mode to drive between the first gear ratio and the second gear ratio than in the second shift mode.

6. The method of shifting of claim 1 wherein the first shift mode offers a wider range of engine speeds in which the transmission will shift between the first gear ratio and the second gear ratio than the second shift mode.

7. The method of shifting of claim 1 wherein the first shift mode offers a different clutch configuration for a clutch associated with the transmission than the second shift mode.

8. The method of shifting of claim 1 wherein the first shift mode offers a different engine configuration for an engine associated with the transmission than the second shift mode.

9. The method of shifting of claim 1 wherein the at least one vehicle condition comprises a plurality of vehicle conditions.

10. The method of shifting of claim 9 including the steps of assigning a ranking value to each of said vehicle conditions and assessing the ranking value to identify the appropriate shift mode.

11. A method of shifting a vehicle transmission, comprising the steps of:
    having at least a first shift mode and a second shift mode, each of the modes permitting a transition from a first gear ratio to a second gear ratio of an automatic manual transmission;
    electronically sensing a plurality of vehicle conditions;
    electronically evaluating the sensed plurality of vehicle conditions by assigning a ranking value to each of the sensed plurality of vehicle conditions and assessing the ranking value;
    electronically selecting from among at least the first shift mode and the second shift mode based on the evaluated vehicle conditions; and
    transitioning from the first gear ratio to the second gear ratio based on the selection wherein the first shift mode transitions the transmission from the first gear ratio to the second gear ratio faster than does the second shift mode.

12. The method of shifting of claim 11 wherein the first shift mode permits the reaching of a predetermined engine torque faster than the second shift mode.

13. The method of shifting of claim 11 wherein the first shift mode results in faster engine braking than the second shift mode.

14. The method of shifting of claim 12 wherein a transmission actuator acts faster in the first shift mode to drive between the first gear ratio and the second gear ratio than in the second shift mode.

15. The method of shifting of claim 12 wherein the first shift mode offers a wider range of engine speeds in which the transmission will shift between the first gear ratio and the second gear ratio than the second shift mode.

16. The method of shifting of claim 12 wherein the first shift mode offers a different clutch configuration for a clutch associated with the transmission than the second shift mode.

17. The method of shifting of claim 12 wherein the first shift mode offers a different engine configuration for an engine associated with the transmission than the second shift mode.

18. A vehicle transmission system, comprising:
    an automatic manual transmission including a plurality of gear ratios;
    at least one vehicle condition sensor; and
    a control unit in communication with said at least one vehicle condition sensor to control shifting of said automatic manual transmission between said plurality of gear ratios, said control unit selecting from a plurality of shift modes including at least a first shift mode and a second shift mode based on data received from said vehicle condition sensor with said first shift mode shifting from a first gear ratio to a second gear ratio at a first predetermined speed and with said second shift mode shifting from said first gear ratio to said second gear ratio at a second predetermined speed that is less than said first predetermined speed.

* * * * *